April 7, 1959 E. H. LAND ET AL 2,880,659
PHOTOGRAPHIC APPARATUS
Filed Jan. 28. 1957 3 Sheets-Sheet 1

Edwin H. Land
Vaito K. Eloranta
INVENTORS

BY Brown and Mikulka
and
Robert E. Corb
ATTORNEYS

April 7, 1959 — E. H. LAND ET AL — 2,880,659
PHOTOGRAPHIC APPARATUS
Filed Jan. 28, 1957 — 3 Sheets-Sheet 2

INVENTORS
Edwin H. Land
Vaito K. Eloranta
BY Brown and Mikulka
and
Robert E. Corb
ATTORNEYS

Edwin H. Land
and
Vaito K. Eloranta
INVENTORS

BY Brown and Mikulka
and
Robert E. Corb
ATTORNEYS

United States Patent Office 2,880,659
Patented Apr. 7, 1959

2,880,659

PHOTOGRAPHIC APPARATUS

Edwin H. Land, Cambridge, and Vaito K. Eloranta, Needham, Mass., assignors to Polaroid Corporation, Cambridge, Mass., a corporation of Delaware Application January 28, 1957, Serial No. 636,624

18 Claims. (Cl. 95—13)

This invention relates to photographic apparatus, particularly in the form of cameras, for exposing and processing photosensitive sheet materials.

Objects of the invention are: to provide photographic apparatus in the form of a camera for exposing and processing photosensitive sheet materials and wherein at least two sheets, one of which is photosensitive, are spaced apart during exposure of the photosensitive sheet and are thereafter superposed with one another with a layer of fluid reagent therebetween for processing the photosensitive sheet to produce a visible image; and to provide a camera as described characterized by its compactness, small overall size relative to image size, simplicity of construction and ease of operation.

Other objects of the invention are: to provide a folding camera as described comprising two relatively movable housing sections and a novel shutter mechanism in association with one of said housing sections whereby a compact structure of relatively small size is achieved; to provide, in a camera as described, a shutter including elements mounted for rotation about axes obliquely inclined to the focal axis of said camera; to provide a camera as described including means whereby a pair of photographic sheets, secured in superposition with one another, may be introduced into said camera, separated from one another during introductory movement, spaced apart from one another with one of said sheets in position for exposure, and superposed with one another following exposure during withdrawal from said camera, and means for distributing a fluid composition between said sheets as they are being superposed; to provide a camera as described wherein at least a pair of sheets, one of which is photosensitive and both adapted to be superposed with one another during withdrawal from the camera, are stored apart from one another within two relatively movable housing sections comprising a camera; to provide a camera as described wherein relative movement of said housing sections is operative to cock said shutter preparatory to releasing said shutter for making an exposure; and to provide a camera as described wherein said superposed sheets are initially separated during introductory movement and thereafter are spaced apart by relative movement of said housing sections.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

A variety of cameras of the so-called self-developing type have been proposed wherein one of at least a pair of sheets located within the camera is exposed and the two sheets are thereafter superposed with one another while a fluid processing reagent is distributed in a layer between the sheets. In general these cameras, whether of the box type or folding type, have been large and bulky in relation to the image size or the size of the picture produced. This bulk is a result of the inclusion in the camera of not only the components found in conventional cameras, but additional elements special to this type of camera and including, for example, means for storing the sheets of two or more pairs of sheets apart from one another; means for superposing the sheets of each pair following the exposure of one of said sheets and distributing a fluid reagent therebetween; means for feeding and moving the sheets through and/or from the camera and including means for controlling the movement of the sheets; and means for providing the fluid reagents for distribution between the sheets. The present invention contemplates a camera construction characterized by its compactness, small relative size, simplicity of construction and ease of operation, made possible by a novel combination, construction and arrangement of the components of the camera.

Generally the camera of the present invention is a folding camera comprising two relatively movable housing sections, one a forward section mounting a lens and shutter, and the other a rear section providing means for locating at least a frame of a photosensitive sheet for exposure in the focal surface of the lens. The two housing sections are pivotally secured to one another adjacent one end of the forward section and are joined by a collapsible bellows which, when the forward section is unfolded to an oblique angle with respect to the rear section, cooperates with the forward section to provide a light path between the lens and shutter on the forward section and a photosensitive sheet positioned for exposure in the rear section. The construction of the two sections and the shutter mechanism is such that, when folded together, they form a camera structure which is relatively compact, being comparatively thin and only a little larger than the picture size. The camera includes means for positioning at least one pair of sheets within the camera with the sheets located apart from one another during exposure and with the photosensitive sheet of each pair located within the rear section and the other sheet of each pair adapted to be superposed with the photosensitive sheet located within the forward section.

The camera is similar in some respects to the camera disclosed in my copending application, Serial No. 537,982, filed October 3, 1955, (now U.S. Patent No. 2,834,269), insofar as a pair of sheets, one of which is photosensitive and is exposed within the camera, are withdrawn from the camera following exposure and during withdrawal the sheets are superposed and a layer of fluid processing composition is distributed therebetween. A plurality of pairs of sheets may be provided in the camera and withdrawn, one at a time, therefrom; or a single pair of sheets secured in superposition and comprising a film unit may be introduced into the camera, the sheets separated from one another and spaced apart within the camera during exposure and then withdrawn from the camera to effect the processing of the sheets. The camera of the invention includes novel means for superposing the sheets and spreading a fluid reagent therebetween while permitting the introduction and withdrawal of the sheets into and from the camera. This last-mentioned means is simple and compact in construction and is easy and convenient to operate. It also includes novel means for initially separating a pair of superposed sheets comprising a film unit during introductory movement into the camera whereby the two sheets are located within different housing sections so that they are spaced apart by unfolding of the camera.

Each pair of sheets or film unit includes a photosensitive sheet preferably comprising a photosensitive silver halide layer on a suitable support, a second sheet superposable with the photosensitive sheet and a rupturable container carrying a quantity of a fluid processing reagent. While the second sheet may merely aid in spreading the fluid reagent in a thin layer on the photosensitive sheet, in a preferred form it serves as an image-receptive element or support for a positive photographic print formed by diffusion transfer-reversal. The container is preferably associated with one of the sheets of each pair and contains one of the fluid reagents known to the art capable of producing a transfer image in the second sheet by diffusion transfer-reversal when spread in a thin layer between the photosensitive and second sheets. The two sheets are opaque to actinic light so that exposure of the photosensitive layer is prevented when the two sheets are located in superposition either before or after exposure and during processing.

Reference is now made to the drawings wherein there is illustrated one form of camera embodying the invention and of the type into which film units, each comprising a photosensitive sheet and a second sheet secured in superposition therewith, are introduced one at a time and exposed and processed within the camera. This camera, designated 10, comprises a rear housing section 12 including a rear wall 14 and side walls 16 and 18 arranged so that the forward housing section is substantially completely open at the front, except at its lower portion where there is provided a relatively short forward wall portion 20 and at its upper portion where there is provided a relatively short forward wall portion 22. The lower forward wall portion 20 cooperates with the rear and side walls to provide a chamber within which is housed a pressure-applying device which will be described hereinafter. Upper wall portion 22 cooperates with an upper wall 24 and intermediate wall 26 to provide a housing for a conventional view finder, designated 28.

The camera includes a forward housing section, designated 30, comprising a forward wall 32, side walls 34 and an inner or rear wall 36 disposed closely adjacent the forward wall and cooperating with the latter and the side walls to define a shallow storage chamber 38. In a preferred form, the second or receiving sheet is intended to provide a support for a positive silver print and its surface, accordingly, is white and highly reflective, thus making it desirable that the receiving sheet be enclosed within a chamber apart from the photosensitive sheet so that light from the camera lens is not likely to be reflected from the surface of the receiving sheet, chamber 38 being provided for this purpose. Forward housing section 30 is so constructed as to fit within the open front of rear housing section 12 between side walls 16 and 18 and includes a relatively short upper wall 40 disposed at an angle with respect to forward wall 32 and rear wall 36 and defining an end of storage chamber 38. Forward housing section 30 is pivotally mounted adjacent its lower end on a pin 42 between side walls 16 and 18 so that it is movable from a closed or folded position (see Fig. 3) within the rear section to an unfolded or open and operative position (see Figs. 1 and 2), wherein it is disposed at an oblique angle with respect to the rear section. Suitable means such as a pair of folding linkages 44 are provided for holding the forward housing section in the open position. Upper wall 40 is disposed at an angle with respect to forward wall 32 such that wall 40 is located in a plane substantially parallel to rear wall 14 when the forward housing section is in open or operative position.

The camera is provided with exposure means in the form of a lens 46 mounted in upper wall 40 with its optic axis substantially perpendicular to the plane of wall 40 and perpendicular to the plane of rear wall 14 when the camera is unfolded and in operative position. When the camera is unfolded and the forward section is in operative position, lens 46 is so located with respect to rear wall 14 that a photosensitive sheet, disposed against the forward surface of the rear wall, is in position for exposure substantially at the focal surface of the lens. Suitable means such as guide tracks 48 are provided on rear wall 14 for engaging the margins of the photosensitive sheet for retaining it against the rear wall in position for exposure. A collapsible bellows 50 is provided secured within the open front of rear housing section 12 and to forward housing section 30 to provide a dark chamber or path for light from the lens to a photosensitive sheet positioned for exposure in the rear section. The bellows is preferably of the type which folds inwardly with a single tuck so that it does not extend laterally beyond side walls 34 and its folded thickness is maintained at a minimum whereby the lateral dimensions of the folded camera, together with the thickness dimensions of the folded camera, may be maintained at a minimum.

Figures 1, 2:
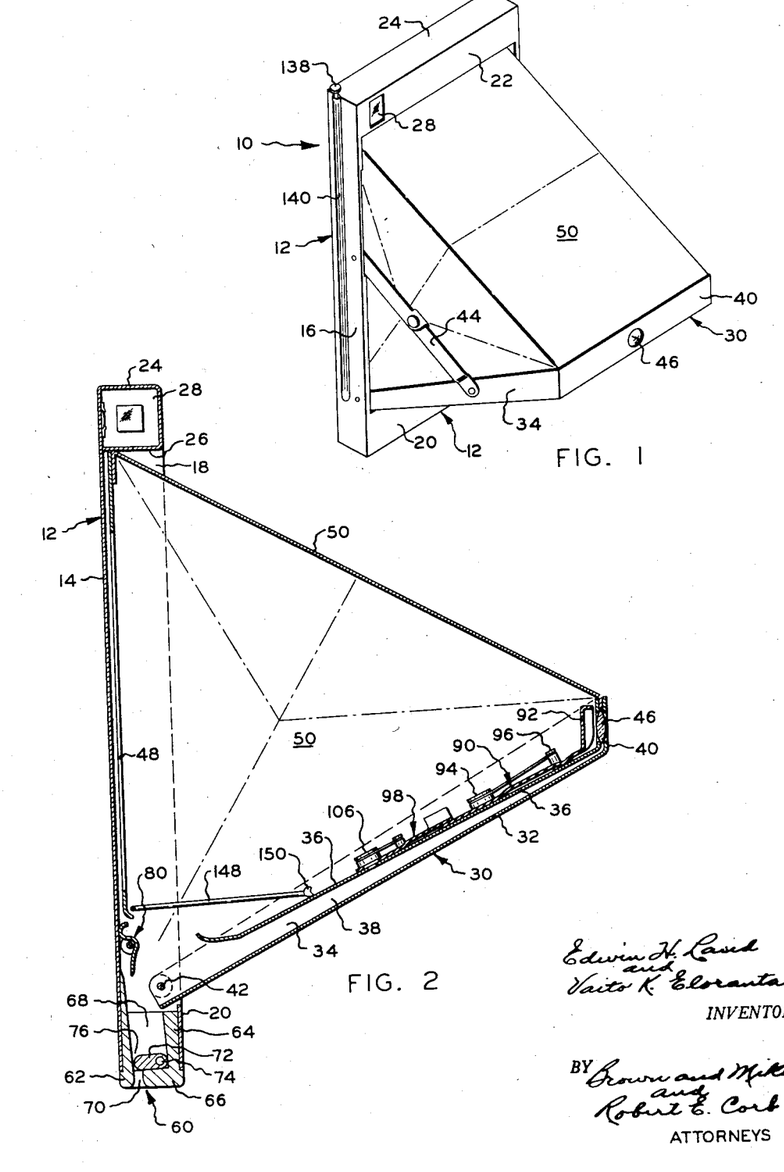
Figure 1 is a perspective view of a camera embodying the invention, shown in an operative position.
Fig. 2 is a somewhat schematic sectional view of the camera of Fig. 1 taken generally midway between the sides of the camera.
Figures 3, 6:
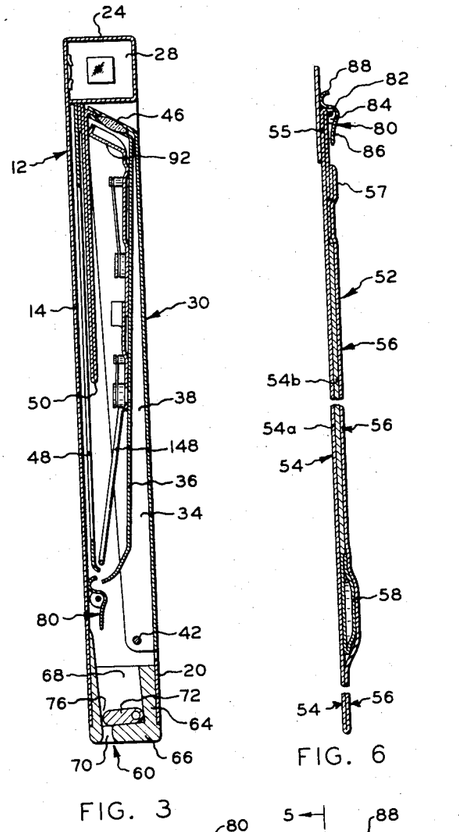
Fig. 3 is a view, similar to Fig. 2, showing the camera in a folded position.
Fig. 6 is an exaggerated sectional view of a film unit adapted to be employed in the camera together with the sheet-separating device of Fig. 4.
Figure 4:
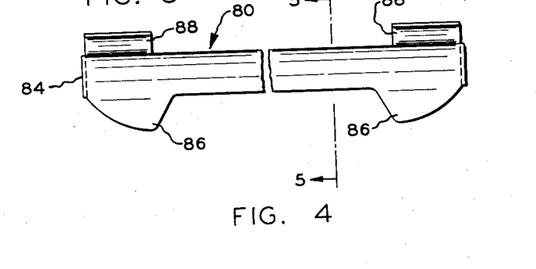
Fig. 4 is an elevational view of a sheet-separating device comprising one component of the camera mechanism.
Figure 5:
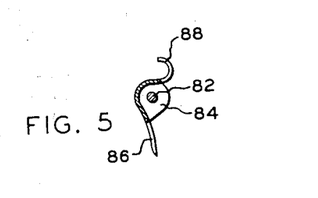
Fig. 5 is a sectional view taken along the line 5—5 of Fig. 4.
Figure 7:
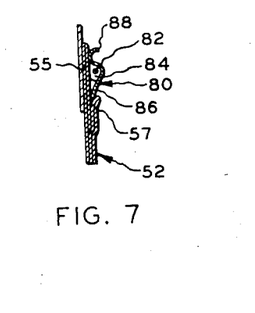
Fig. 7 is a view, similar to Fig. 6, showing the operation of the sheet-separating device of the camera on the film unit.
Figure 8:
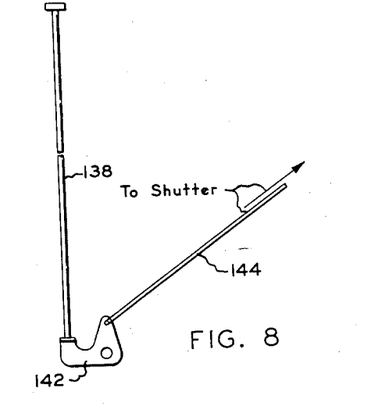
Fig. 8 is an elevational view showing the actuating mechanism of the camera.

The camera of Figure 1 is adapted to be operated by introducing a film unit comprising a photosensitive sheet and a second sheet secured in superposition with one another into the camera through a pressure-applying and fluid-spreading device located in a lower part of the camera behind lower front wall portion 20. As the film unit is moved into the camera, the two sheets are separated from one another with the photosensitive sheet being located against rear wall 14 by guide tracks 48 while the second sheet is guided into storage chamber 38 in front of wall 36. A typical film unit, designated 52, is shown in Fig. 6 of the drawings and comprises a photosensitive sheet 54 and a second sheet 56 secured in superposed relation. The photosensitive sheet comprises a support sheet 54a and a photosensitive layer or sheet 54b preferably comprising a photosensitive silver halide emulsion mounted on the support sheet between the sheets. Both sheets 54 and 56 are provided with at least an outer coating of a material which is opaque to actinic light or are formed of a material that is opaque to actinic light so that the photosensitive layer is shielded from exposure when the two sheets are in superposition. Second sheet 56 may comprise an inner receiving layer on a suitable opaque support or may comprise a support sheet with an image-receiving sheet mounted thereon and similar in construction to photosensitive sheet 54. The two sheets are substantially coextensive in width and are hingedly secured together adjacent one end, designated the trailing end, so that the two sheets are restrained against lateral movement with respect to one another. The leading ends of sheets 54 and 56, designated, respectively, 55 and 57, are folded inwardly upon themselves with the folded leading end 55 of sheet 54 extending beyond the folded leading end 57 of sheet 56. The two sheets are initially secured in superposition at their margins in any of several manners and are preferably secured at their ends by an adhesive located between the leading ends of the sheets, while the lateral margins of the sheets may be secured together by an adhesive or preferably by a binding tape which also aids in preventing light from entering between the margins of the sheets.

The photosensitive layer 54b defines an exposure frame located adjacent the leading end of the film unit and the second sheet includes an image-receiving layer at least coextensive with the exposure frame. There is secured to one of the sheets adjacent the trailing edge of the exposure frame an elongated rupturable container 58 extending at least from side to side of the exposure frame and having a discharge mouth located adjacent one transverse edge of emulsion layer 54b directed toward the leading end of the film unit. The container may be formed by folding a rectangular blank of sheet material lengthwise and securing the two sections together at their margins to form a fluid-carrying cavity. The longitudinal margins of the container provide a discharge mouth adapted to permit the discharge of the fluid contents of the container when subjected to compressive pressure. This compressive pressure is generated during movement of the film unit commencing at its leading end through a gap between a pair of pressure-applying members which may be fixed with respect to one another or urged toward one another by suitable spring means. As the fluid contents of the container are ejected therefrom between the sheets, the fluid is spread in a thin layer of predetermined thickness between the photosensitive layer and the image-receiving layer of the sheets by continued movement thereof through the gap between the pressure-applying members. In a preferred form of camera shown, the pressure-applying members are located a fixed distance apart so that the thickness of the film unit in the region of the container, that is, the combined thickness of the two layers comprising the container and the two sheets in this region, should not exceed the combined thickness of the film unit together with the fluid layer in a region of photosensitive layer 54a.

The fluid-spreading and pressure-applying device of the invention, while comprising a gap of fixed width for spreading the fluid in a layer between the sheets, must also allow for introductory movement of the film unit into the camera through the gap between the pressure-applying members without applying pressure to the unit so that the container is not ruptured during introduction; then during withdrawal of the film unit, the device must apply compressive pressure to the film unit for rupturing the container and spreading its fluid contents in a layer between the sheets, and the device must also function as a light seal for preventing light from entering the camera during introduction and removal of the film unit and exposure of the film unit. All of these functions are performed by a novel device which is simple in construction and assembly, small and compact, and easy to operate.

The fluid-spreading device, designated 60, comprises a member having a U-shaped cross section including a longitudinal rear wall 62, forward wall 64 and connecting side wall 66 and two end walls 68 joining the longitudinal walls to form an elongated chamber. The device is adapted to fit within the lower end of rear housing section 12 with rear wall 62 located against rear wall 14 so that side wall 66 closes the lower end of the rear housing section. Side wall 66 is provided with an elongated slot 70, one side of which comprises rear wall 62, adapted to receive a film unit 52. Mounted within device 60 between the front and rear walls thereof is an elongated, pivotable, pressure-applying member 72. The pressure-applying member extends substantially from end to end of the device between end walls 68 and is pivotally mounted adjacent one longitudinal edge portion on a pin 74 secured at its ends in end wall 68 so that member 72 is pivotable upwardly from an operative position wherein the other longitudinal edge portion of member 72 is located across slot 70 adjacent rear wall 62 to an inoperative position wherein a film unit is movable through the slot between rear wall 62 and a pressure-applying member without the application of compressive pressure to the film unit. The pressure-applying member, when in operative position, is located with its lower surface against the inner surface of side wall 66 and the fixed pressure-applying gap through which the sheets are drawn is defined by a longitudinal edge portion of member 72 and the inner surface of rear wall 62. The width of this gap, designated 76, is subject to accurate control by controlling the spacing between opposite surfaces of walls 62 and 64 and the transverse dimension of member 72 since, as the film unit is withdrawn from a camera, the forward longitudinal edge portion of member 72 is retained against forward wall 64. The hole in member 72 through which pin 74 extends is made larger than the pin so that there is a loose fit between the pin and hole and the pin does not therefore control the positioning of member 72 or the width of the pressure-applying gap between the member and rear wall 62.

A suitable spring means (not shown), for example a torsion spring coiled around the pin, is provided for urging member 72 in a counterclockwise direction (viewing Figs. 2 and 3) into operative position. This spring is sufficiently weak so that as a film unit is introduced into the camera through slot 70 member 72 is pivoted in a clockwise direction, due to friction with the film unit, out of pressure-applying position, allowing the container to pass through the fluid-spreading device between rear wall 62 and member 72 without the application of compressive pressure on the film unit or container. Then as the film unit is withdrawn from the camera, the action of the spring, aided by engagement of member 72 with the film unit, causes the member to pivot automatically into operative pressure-applying position against side wall 66 where it remains throughout withdrawal of the film unit from the camera. The pressure-applying member, being resiliently urged into operative position, is always held in contact with a portion of the film unit extending through slot 70 and thereby operates to provide a light seal for the camera.

As noted previously the leading ends 55 and 57 of the sheets of a film unit 52 are secured together preferably by an adhesive, while the longitudinal edges of the sheets are secured together by a binding tape. Accordingly, means are provided for spacing apart the two sheets as they are introduced into the camera and preferably includes means for stripping apart the leading ends of the sheets and splitting or slitting the binding tapes. In the form shown, this means comprises an elongated splitter 80, preferably formed of sheet metal, mounted for limited pivotal movement adjacent rear wall 14 and the lower ends of guide tracks 48 and rear wall 36 (when housing section 30 is in folded position). Splitter 80 is pivotally mounted on a pin 82 at a pair of rearwardly extending end tabs 84 and includes a pair of downwardly projecting cutting blades 86 at its ends adapted to project between the margins of a film unit for slitting the binding tape as the unit is moved against the blades. The upper side of the splitter is provided at its ends with a pair of U-shaped cam members 88 which project rearwardly toward rear wall 14 and into contact with the rear wall. Suitable spring means (not shown) are provided for urging splitter 80 in a counterclockwise direction (viewing Figs. 2, 3, 6 and 7) so that cam members 88 contact rear wall 14 and blades 86 are spaced away from the wall.

Thus, as a film unit 52 is introduced into the camera, leading end 55 of the photosensitive sheet will pass behind blades 86 between the latter and rear wall 14. Leading end 55 engages members 88, causing the splitter to be pivoted in a clockwise direction, thereby moving blades 86 rearwardly into contact with the margins of sheet 54 so that, as introductory movement of the film unit is continued, the blades enter between the leading end of sheet 54 and leading end 57 of second sheet 56, splitting the two sheets apart and guiding them along separate paths. Photosensitive sheet 54 is guided in contact with rear wall 14 behind the splitter and guide tracks 48 while second sheet 56 is guided in front of rear wall 36 into storage chamber 38 as the binding tapes are split by the blades. It will be noted that blades 86 and members 88 are designed to contact only the margins of the sheets so that the emulsion layer of photosensitive sheet 54 is not likely to be scratched or marred by contact with the splitter.

The folded leading ends of sheets 54 and 56 facilitate initial separation of the sheets, first due to their natural resilience and tendency to unfold combined with their stiffness which makes it easier for the blades to enter between the sheets. The added thickness of leading end 55 causes greater pivotal movement of the splitter than would be caused by a single thickness of the sheet, further assuring entrance of the blades between the sheets. Container 58, as noted, may be secured to either of the sheets and when it is secured to photosensitive sheet 54 member 80 may be so constructed that at least a part of the container will pass behind the blades during introduction of the film unit; or, if desired, when the container is secured to second sheet 56, splitter 80 may be so constructed that blades 86 will extend behind the container between the latter and sheet 54 so that the container is guided with sheet 56 into chamber 38.

As the film unit is withdrawn from the camera following exposure of the photosensitive sheet, the two sheets are superposed by device 60 and the fluid contents of container 58 are discharged therefrom and spread in a thin layer between the sheets. To insure a complete spread of processing fluid in a layer of predetermined uniform thickness over a predetermined area, the fluid is usually supplied in a quantity in excess of the amount required so that means must be provided for collecting or trapping the excess fluid so that it is not squeezed from between the sheets into fluid-spreading device 60. In this regard, leading ends 55 and 57 perform a service in that one or both is caused to unfold as the film unit is withdrawn and excess fluid is collected either between the unfolded ends of both sheets or within a pocket formed by the folded end of one of the sheets. The layer of fluid spread between the sheets adheres the sheets together as they are withdrawn so that further exposure of the photosensitive layer is prevented.

As a general rule conventional shutter mechanisms which are associated with a lens and which include rotary elements, such as blades, for obturating the lens aperture are constructed so that these rotary elements pivot about axes substantially parallel with the axis of the lens. For this reason the larger dimensions of the shutter lie in planes perpendicular to the pivotal axes of the shutter elements, that is, in the plane of rotation of the shutter elements. Usually, when a shutter of this type is incorporated into a folding camera, that is, a camera wherein the lens and shutter assembly is mounted on one section of the camera which includes a second section for positioning the photosensitive material for exposure, there is associated with the camera an expensive and often complicated erecting mechanism which maintains the shutter erect when the camera is both opened and folded and for accurately positioning the shutter with respect to the photosensitive material mounted for exposure within the second section. By maintaining the shutter in an erect position, that is, with the pivotal axes of the shutter elements perpendicular to the focal surface of the camera in the second section thereof when the camera is folded, the thickness of the camera is at a minimum. Thus, a camera of this type not only requires an erecting mechanism, which is eliminated by the construction of the invention, but also requires a more expensive four-sided bellows which will not fold as completely as the three-sided single tuck bellows of the invention. Cameras have been proposed comprising two relatively movable sections and including a three-sided bellows as in the present invention. However, the rotary elements of the shutters employed are mounted for rotation about axes parallel to the lens axis so that the camera, when folded, is considerably thicker than that of the invention since the shutter, in the folded position of the camera, is disposed with its greater dimensions, that is, length and width (or diameter), positioned obliquely or even perpendicularly to the focal surface of the camera since the lens axis and pivotal axis of the shutter elements are located either parallel with or at an acute angle to the focal surface of the camera.

By virtue of its novel construction including the shutter construction, the camera of the present invention, when folded, is thinner and more compact than most conventional cameras since the axes of the rotary elements of the shutter are disposed substantially perpendicular to the focal surface of the camera, with the result that the major dimensions of the shutter lie in a plane substantially parallel to this focal surface (and major dimension) of the camera. When the camera is folded, the lens is positioned with its axis at an acute angle to the focal surface of the second section of the camera so that the thickness of the folded camera of the invention is attributable in large part to the diameter of the lens rather than the dimensions of the shutter assembly.

A photographic shutter, constructed in accordance with the invention and suitable for incorporation into the camera of the invention, is illustrated in Figs. 9 through 12 of the drawings. The components of the shutter mechanism are mounted on the rear or inside of rear wall 36 and are substantially flat with the exception of members which obturate the lens aperture, with the result that the shutter mechanism is comparatively thin. An additional saving in space is realized by mounting the shutter components on a wall of the camera housing rather than on a separate wall comprising a shutter housing and by leaving the shutter components unenclosed, that is, open to the inside of the camera. The shutter components, and the interior surface of wall 36, as well as all other interior surfaces of the camera, are non-reflecting and light absorbing, and accordingly are provided with at least a nonreflecting and light-absorbing finish so that no light from lens 46 is reflected from the camera components to the photosensitive sheet.

The shutter comprises a substantially flat aperture-covering blade 90 having a curved or frusto-conical upstanding end section 92 at one end. Blade 90 is pivotally mounted intermediate its ends on a stud 94 so that, in its normal position of rest or aperture-covering position, end section 92 extends upward at an angle across the aperture of lens 46. The major portion of blade 90 is located in a plane parallel to wall 36 and end section 92 extends upward at an angle therefrom substantially parallel with upper housing wall 40. End section 92 may be enlarged or weighted so as to add momentum to the movement of the blade. A stud 96 is provided adjacent one edge of blade 90 providing a limit stop at the aperture-covering position of the blade and a torsion spring 97, secured intermediate its ends to stud 94 and at its ends to stud 96 and blade 90, is provided for urging the blade in a counterclockwise direction (viewing Fig. 9) into aperture-covering position against stud 96. Means are provided for pivoting blade 90 in a clockwise direction so as to uncover the aperture of lens 46 and, in the form shown, comprises an actuating element 98, having three arms designated kicker arm 100, cocking arm 102 and latch arm 104, pivotally mounted at the intersection of said arms on a stud 106. A relatively strong torsion spring 108 is provided secured intermediate its ends to stud 106 and at its ends to latch arm 104 and a stud 110 located between arms 100 and 102. Spring 108 urges actuating element 98 in a counterclockwise direction toward stud 110, the latter being adapted to act as a limit stop for element 98.

Actuating element 98 is mounted so that the end of kicker arm 100 will overlap or intersect the end of blade 90 which is opposite end section 92. During cocking of the shutter in preparation for release and actuation, the end of kicker arm 100 is pivoted from a position to the left of the end of blade 90, in a clockwise direction across the end of the blade, to the right side thereof. The end of the blade is provided with an upturned engagement portion 112 which tapers toward the left. The end of kicker arm 100 includes an upturned edge portion 114 on its left edge adapted to engage upturned portion 112 during counterclockwise rotation of element 98 and its right-hand corner portion 116 is bent slightly away from wall 36 so that, during clockwise rotation of element 98, the end of arm 100 will engage, deflect and ride over the upturned portion 112 at the end of blade 90. Both blades are preferably resilient so that each will deflect to the extent necessary to allow arm 100 to pass over the end of blade 90 and portion 112. When the shutter is released, element 98 pivots in a counterclockwise direction under the bias of spring 108 so that upturned edge portion 114 on the end of kicker arm 100 engages upturned portion 112 on the end of blade 90, imparting an aperture-uncovering clockwise rotary motion to the blade which will return in a counterclockwise direction to aperture-covering position under the bias of spring 97.

Release means are provided for retaining element 98 in its cocked position with the end of arm 100 positioned to the right of upturned portion 112 on the end of blade 90. This release means comprises a generally L-shaped release lever 120 pivotally mounted on a stud 122. A torsion spring 124 is provided, coiled at its medial portion around stud 122 and secured at one end to lever 120 and at its other end to stud 126 for urging lever 120 in a counterclockwise direction into latching position against stud 126, the latter acting as a limit stop for movement of the lever. Lever 120 includes a latch arm 128 extending substantially perpendicular to arm 104 of actuating element 98 and includes an end section extending toward arm 104 having an upturned engagement portion 130 at its end which is tapered away from stud 122. Engagement portion 130 is provided for engaging the end of latch arm 104 of element 98 for retaining the latter against counterclockwise movement when element 98 is in cocked position.

Element 98 is released by counterclockwise movement of lever 120 whereby portion 130 is disengaged from arm 104. Since the shutter is set or cocked by clockwise movement of actuating element 98, means are provided whereby the end of arm 104 may be moved past and in engagement with the end of arm 128 including engagement portion 130. For this purpose, there is provided a corner portion 132 at the end of arm 104 which is upturned slightly so that arm 104 will ride up and over the end of arm 128 and portion 130 during clockwise movement of arm 104, both arms being resilient so that they may be readily deflected sufficiently for this purpose. Release lever 120 includes a second arm 134 extending at a right angle from arm 128. An elongated member 136 comprising a component of a manually operable release linkage is mounted for axial sliding movement on wall 36 and is coupled at one end to the end of arm 134 so as to pivot the latter for releasing the shutter for operation. The manually operable release linkage comprises an elongated rod 138 mounted for axial movement in an enlarged portion 140 of side wall 12. The upper end of rod 138 projects above upper wall 24, where it may be manually engaged, and the lower end of the rod extends into the lower end of the camera where it engages one arm of a crank member 142 so as to pivot the latter in a counterclockwise direction when the rod is depressed downwardly. Crank member 142 is, in turn, connected to the upper end of member 136 by a link member 144, a crank 145, and shaft 146, whereby the movement of rod 138 is transmitted to release lever 120.

Figure 9:
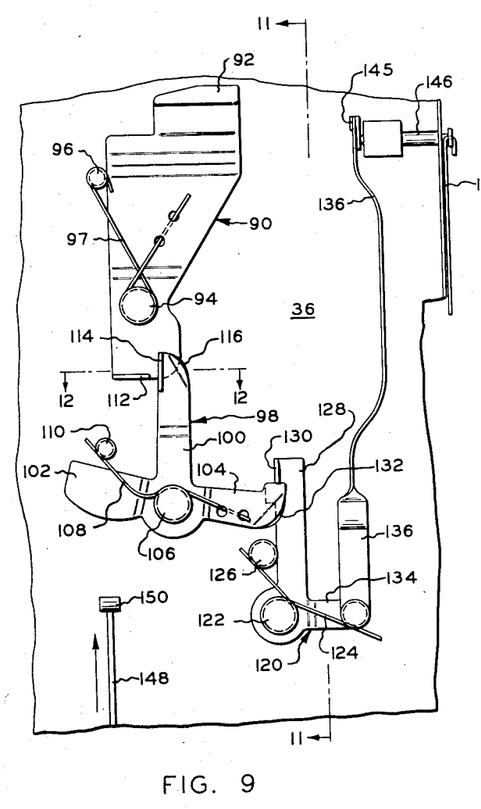
Fig. 9 is a plan view of a shutter mechanism embodying the invention.
Figure 10:
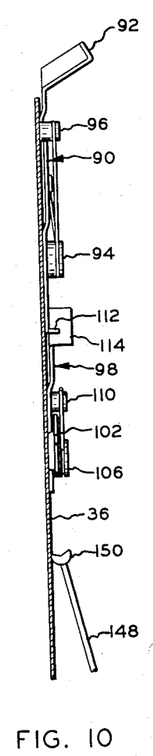
Fig. 10 is an elevational view of the shutter of Fig. 9.
Figure 11:
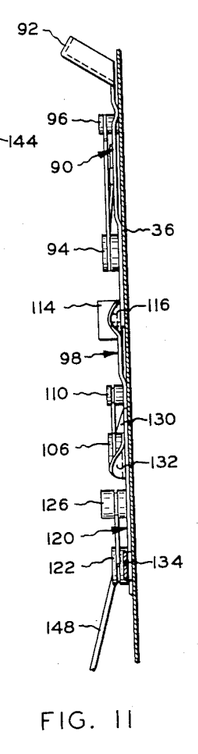
Fig. 11 is a sectional view taken along the line 11—11 of Fig. 9.
Figure 12:
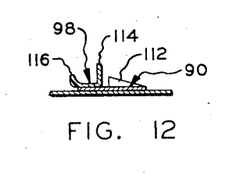
Fig. 12 is a sectional view taken along the line 12—12 of Fig. 9.

Setting or cocking of the shutter, i.e., counterclockwise rotation of actuating element 98 for tensioning spring 108, is effected automatically by closing or pivoting forward housing section 30 in a counterclockwise direction, viewing Fig. 9, into closed position. Accordingly, there is provided a pusher rod 148 pivotally mounted at one end on the rear housing section between side walls 16 and 18 adjacent splitter 80 and biased in a clockwise direction so that its other end, which includes an enlarged engagement section 150, bears against rear wall 36. Rod 148 is so positioned that engagement section 150 engages cocking arm 102 of actuating element 98 and pushes upwardly on the latter to rotate the element during pivotal movement of housing section 30 into closed position.

To make an exposure and produce a finished photographic print with the camera of the invention, a film unit 52 is introduced into the camera through passage 70 while the camera is in folded position. The leading end of the film unit deflects pressure-applying member 72 and moves against splitter 80 where leading end 55 of photosensitive sheet 54 moves between the splitter and rear wall 14, while the leading end 57 of second sheet 56 is separated from the photosensitive sheet and moves in front of the splitter into chamber 38 between walls 32 and 36 of forward housing section 30. When the photosensitive sheet is in exposure position between guide tracks 48, the camera may be unfolded and section 30 pivoted into its open or operative position and the exposure is made by depressing rod 148. The camera may then be folded into inoperative position or, if desired, allowed to remain unfolded in operative position while the film unit is withdrawn therefrom through passage 70 and pressure-applying gap 76 between pressure-applying member 72 and rear wall 62. As the film unit is withdrawn through gap 76, the sheets are superposed and the fluid processing composition, carried in container 50, is spread in a thin layer between the sheets, laminating them together. The sheets may be stripped from one another at the end of a predetermined processing period to reveal the finished photographic print on the second sheet. As the camera is folded, i.e., forward section 30 is pivoted to its closed position either before or after the film unit is withdrawn and prior to introduction of another film unit, the shutter mechanism is automatically cocked or set for making the next exposure.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for use with a film unit comprising a photosensitive sheet and a second sheet secured in superposition therewith, said apparatus comprising, in combination, a first casing means providing a first chamber, guide means within said first chamber for positioning a photosensitive sheet for exposure, second casing means pivotally mounted at one end on said first casing means adjacent one end of the latter, said second casing means including inner and outer spaced-apart walls providing a second chamber between said walls for positioning a second sheet apart from said photosensitive sheet, said second casing means being pivotable between a first position wherein it is located within said first chamber and a second position wherein it is disposed at an angle with respect to said first casing means, means defining a passage located adjacent said one end of said first and second casing means and communicating with said first and second chambers, means located within said passage for separating the pair of superposed photosensitive and second sheets comprising a film unit during introductory movement of said film unit through said passage into said apparatus and, when said second casing means is in said first position, for guiding said photosensitive sheet into engagement with said guide means and said second sheet into said second chamber, a folding bellows secured between said first and second casing means and adapted, when said second casing means is in said second position, to provide a chamber between said casing means, exposure means associated with said second casing means, said exposure means including a spring operated shutter mechanism having at least a rotary element mounted on said inner wall of said second casing means, and means coupled with said passage for superposing said photosensitive and second sheets and distributing a fluid processing reagent therebetween during movement of said sheets through said passage.

2. Photographic apparatus for use with a film unit comprising a photosensitive sheet and a second sheet secured in superposition therewith, said apparatus comprising, in combination, a first casing means providing a first chamber, guide means within said first chamber for positioning a photosensitive sheet for exposure, second casing means pivotally mounted at one end on said first casing means adjacent one end of the latter, said second casing means including inner and outer spaced-apart walls providing a second chamber between said walls for positioning a second sheet apart from said photosensitive sheet, said second casing means being pivotable between a first position wherein it is located adjacent said first casing means and a second position wherein it is disposed at an angle with respect to said first casing means, means defining a passage located adjacent said one end of said first and second casing means and communicating with said first and second chambers, a bellows having inwardly folding sides secured between said first and second casing means and adapted, when said second casing means is in said second position, to provide a chamber between said casing means, means located within said passage for separating the pair of superposed photosensitive and second sheets comprising a film unit during introductory movement of said film unit through said passage into said apparatus and, when said second casing means is in said first position, for guiding said photosensitive sheet into engagement with said guide means and said second sheet into said second chamber, a shutter mechanism mounted on said inner wall of said second casing means, and means coupled with said passage for superposing said photosensitive and second sheets and distributing a fluid processing reagent therebetween during movement of said sheets through said passage.

3. Photographic apparatus for use with a film unit comprising a photosensitive sheet and a second sheet secured in superposition therewith, said apparatus comprising, in combination, a rear casing section, guide means within said rear casing section for positioning a photosensitive sheet for exposure, a forward casing section pivotally mounted at its lower end on said rear casing section adjacent the lower end of the latter, said forward casing section including spaced-apart front and intermediate walls providing a storage chamber between said walls for positioning a second sheet apart from a photosensitive sheet, said forward casing section having a position wherein it is inoperative for exposure of said photosensitive sheet and a position wherein it is disposed at an angle with respect to said rear casing section and is operative for exposing said photosensitive sheet, said forward casing section being pivotable between said operative and inoperative positions and having an upstanding portion at its upper end located at an oblique angle with respect to said intermediate wall, exposure means including an exposure aperture in said upstanding portion, a shutter mechanism including rotary elements mounted on the rear of said intermediate wall and including at least one rotary element for obscuring said exposure aperture, means defining a passage located at the lower ends of said forward and rear casing sections and communicating with said guide means and said storage chamber, a folding bellows secured between said forward and rear casing sections and adapted, when said forward casing section is in operative position, to provide an exposure chamber between said casing sections, means located within said passage for separating the pair of superposed photosensitive and second sheets of a film unit during introductory movement of said film unit through said passage into said apparatus and, when said forward casing section is in inoperative position, for guiding said photosensitive sheet into engagement with said guide means and said second sheet into said storage chamber, and means coupled with said passage for superposing said photosensitive and second sheets and distributing a fluid processing reagent therebetween during movement of said sheets through said passage.

4. Photographic apparatus comprising, in combination, a rear casing section having a rear wall, guide means within said rear casing section for positioning a photosensitive sheet for exposure against said rear wall, a forward casing section pivotably mounted at its lower end on said rear casing section adjacent the lower end of the latter, said forward casing section including spaced-apart front and intermediate walls providing a storage chamber therebetween for positioning a second sheet apart from a photosensitive sheet engaged in said guide means, said forward casing section having a first position wherein said intermediate wall is located adjacent and generally parallel with said rear wall and a second position wherein said intermediate wall is disposed at an acute angle with respect to said rear wall, said forward casing section being pivotable with respect to said rear casing section between said first and second positions, a folding bellows secured between said forward and rear casing sections for providing an exposure chamber between said sections when said forward casing section is in said second position, an upstanding wall located on the upper portion of said forward casing section extending at an obtuse angle with respect to said intermediate wall, a photographic objective lens mounted on said upstanding wall with its optical axis substantially perpendicular to said rear wall when said forward casing is in said second position, a shutter mechanism mounted on the rear of said intermediate wall, said shutter mechanism comprising a plurality of generally flat rotary elements pivotally mounted on said intermediate wall for rotation about axes substantially perpendicular to said intermediate wall, at least one of said rotary elements including an upstanding portion extending behind said lens for obturating said lens, means providing a passage at the lower ends of said forward and rear casing sections communicating with said guide means and said storage chamber and adapted to receive a film unit including a photosensitive sheet and a second sheet secured together in superposition, and means within said passage so positioned as to extend between the photosensitive and second sheets of a film unit during introductory movement of said film unit into said apparatus through said passage for separating said photosensitive and second sheets, and, when said forward casing section is in said first position, for guiding said photosensitive sheet into engagement with said guide means and said second sheet into said storage chamber.

5. The photographic apparatus of claim 4 including means extending across the lower end of said passage for superposing the photosensitve and second sheets of a film unit and distributing a fluid processing reagent between said sheets during withdrawal of said film unit from said apparatus through said passage.

6. Photographic apparatus for use with a film unit comprising a photosensitive sheet and a second sheet secured in superposition therewith, said apparatus comprising, in combination, a rear casing section having a rear wall and providing a first chamber, guide means within said first chamber for positioning a photosensitive sheet for exposure against said rear wall, a forward casing section pivotally mounted at its lower end on said rear casing section adjacent the lower end of the latter, said forward casing section including spaced-apart forward and intermediate walls providing a second chamber therebetween for positioning a second sheet apart from a photosensitive sheet engaged in said guide means, said forward casing section having a first position wherein it is located within said first chamber with said intermediate wall adjacent and generally parallel with said rear wall and a second position wherein said intermediate wall is disposed at an acute angle with respect to said rear wall, said forward casing section being pivotable with respect to said rear casing section between said first and second positions, means defining a passage located adjacent the lower ends of said forward and rear casing sections and communicating with said first and second chambers, means located within said passage and so positioned as to extend between the photosensitive and second sheets of a film unit during movement of said film unit through said passage into said apparatus for separating said photosensitive and second sheets and, when said forward casing section is in said first position, guiding said photosensitive sheet into engagement with said guide means against said rear wall and said second sheet into said second chamber forward of said intermediate wall, a folding bellows secured between said forward and rear casing sections for providing an exposure chamber between said sections when said forward section is in said second position, an upstanding wall located on the upper portion of said forward casing section and extending upward therefrom at an obtuse angle with respect to said intermediate wall, a photographic objective lens mounted in said upstanding wall with its optical axis substantially perpendicular to said rear wall when said forward casing section is in said second position, a shutter mechanism mounted on the rear of said intermediate wall, said shutter mechanism comprising at least one generally flat rotary element pivotally mounted on said wall for rotation about an axis substantially perpendicular to said intermediate wall and having an upstanding portion extending behind said lens for obturating said lens, and means, coupled with said means for providing said passage, for superposing said photosensitive and second sheets comprising said film unit and distributing a fluid processing reagent between said sheets during movement thereof through said passage.

7. In a photographic apparatus comprising a pair of casing sections secured together for pivotal movement with respect to one another between a first position wherein said apparatus is inoperative for making an exposure, and a second position wherein said sections are located at an angle with respect to one another and said apparatus is operative for making an exposure, the combination in said apparatus of a shutter mechanism mounted on one of said sections, said shutter mechanism being of the type which must be set prior to actuation for making an exposure, and means coupled with said shutter mechanism and with the other of said casing sections for setting said shutter in response to pivotal movement of said casing sections relative to one another from one of said first and second positions to the other.

8. Photographic apparatus as defined in claim 7 wherein said means for setting said shutter mechanism is responsive to pivotal movement of said sections relative to one another from said second to said first position for setting said shutter.

9. In photographic apparatus comprising a rear housing section, a forward housing section and means pivotally mounting said forward housing section at one end on said rear housing section adjacent one end of the latter, said forward housing section being pivotable with respect to said rear housing section between a first position wherein said apparatus is inoperative for exposing a photosensitive material and a second position wherein said forward housing section is located at an angle with respect to said rear housing section and said apparatus is operative for exposing said photosensitive material, and a bellows joined to and extending between said forward and rear housing section to provide a chamber when said housing sections are in said second position, the combination in said apparatus of a shutter mechanism of the type which must be set prior to actuation for making an exposure, said shutter mechanism being mounted on said forward housing section, and means coupled with said shutter mechanism and said rear housing section and responsive to pivotal movement of said forward housing section from one of said first and second positions to the other for setting said shutter.

10. Photographic apparatus as defined in claim 9 wherein said means for setting said shutter mechanism is responsive to pivotal movement of said forward housing section from said second position to said first position for setting said shutter.

11. In photographic apparatus as defined in claim 9 wherein said housing sections are pivotable with respect to one another about a first axis, said means for setting said shutter comprising a member mounted at one end on said rear housing section for pivotal movement about a second axis substantially parallel with said first axis and spaced from said first axis toward the other end of said rear housing section, said member being operatively coupled at its other end with said shutter mechanism.

12. Photographic apparatus adapted to be employed with a film unit including a photosensitive sheet having a folded leading end section and a second sheet having a folded leading end section, said sheets being secured in superposition at their margins and at their leading end sections with said folded leading end section of said photosensitive sheet projecting beyond said folded leading end section of said second sheet, said apparatus including a wall against which said photosensitive sheet is positioned for exposure, said wall comprising one side of a passage through which said film unit is introduced into said apparatus, means for storing said second sheet apart from said photosensitive sheet, and sheet-separating means mounted within said passage adjacent said wall for separating said sheets during introductory movement of said film unit through said passage, said sheet-separating means comprising a member mounted for pivotal movement about an axis intermediate its sides closely adjacent said wall and transversely of said passage and the path of introductory movement of said sheets therethrough, said member including first edge sections extending from one side of said pivotal axis toward the outside end of said passage and second edge sections extending in the opposite direction and toward said wall into the path of movement of said photosensitive sheet located against said wall, said member being pivotable between a first position, wherein said second edge sections are located against said wall in the path of movement of said photosensitive sheet and said first edge sections are spaced from said wall out of the path of at least said photosensitive sheet, and a second position, wherein said second edge sections are spaced from said wall and said first edge sections are displaced toward said wall at least in the path of movement of said second sheet, and spring means for urging said member into said first position wherein said leading end section of said photosensitive sheet moves freely between said first sections of said member and said wall into engagement with said second sections of said member for pivoting the latter into operative position wherein said first sections of said member are located in engagement with the surface of said folded leading end section of said second sheet in the path of movement of said second sheet so as to project between said second sheet and effect the separation of said sheets.

13. The apparatus of claim 12 wherein said first edge sections of said member are located adjacent the ends of said member in position to engage only the lateral margins of said sheets during introductory movement thereof into said apparatus.

14. Photographic apparatus as defined in claim 13 wherein said first edge sections are substantially V-shaped with their apexes extending toward said outside end of said passage and include sharpened outer edges.

15. The apparatus of claim 12 wherein said wall comprises the rear wall of said apparatus and said first edge sections have generally U-shaped cross sections with the curved base portions thereof extending rearwardly and into contact with said rear wall when said member is in said first position.

16. Photographic apparatus for use with a film unit comprising a photosensitive sheet and a second sheet secured in superposition therewith, said apparatus comprising, in combination, a first casing means providing a first chamber, guide means within said first chamber for positioning a photosensitive sheet for exposure, second casing means pivotally mounted at one end on said first casing means adjacent one end of the latter, said second casing means including inner and outer spaced-apart walls providing a second chamber between said walls for positioning a second sheet apart from said photosensitive sheet, said second casing means being pivotable between a first position wherein it is located within said first chamber and a second position wherein it is disposed at an angle with respect to said first casing means, means defining a passage located adjacent said one end of said first and second casing means and communicating with said first and second chambers, means located within said passage for separating the pair of superposed photosensitive and second sheets comprising a film unit during introductory movement of said film unit through said passage into said apparatus and, when said second casing means is in said first position, for guiding said photosensitive sheet into engagement with said guide means and said second sheet into said second chamber, a folding bellows secured between said first and second casing means and adapted, when said second casing means is in said second position, to provide a chamber between said casing means, exposure means associated with said second casing means, said exposure means including a spring-operated shutter mechanism having at least a rotary element mounted on said inner wall of said second casing means, means coupled with said shutter mechanism and said first casing means and responsive to pivotal movement of said first and second casing means relative to one another for setting said shutter mechanism, and means coupled with said passage for superposing said photosensitive and second sheets and distributing a fluid processing reagent therebetween during movement of said sheets through said passage.

17. Photographic apparatus comprising, in combination, a rear casing section having a rear wall, guide means within said rear casing section for positioning a photosensitive sheet for exposure against said rear wall, a forward casing section pivotally mounted at its lower end on said rear casing section adjacent the lower end of the latter, said forward casing section including spaced-apart front and intermediate walls providing a storage chamber between said walls for positioning a second sheet apart from a photosensitive sheet engaged in said guide means, said forward casing section being pivotable between a position wherein it is inoperative for exposing said photosensitive sheet and an operative position wherein it is disposed at an angle with respect to said rear wall, a folding bellows secured between said forward and rear casing sections for providing an exposure chamber when said forward casing section is in operative position, said forward casing section having means located at its upper end and including an exposure aperture for mounting an objective lens with its axis perpendicular to said rear wall when said forward casing section is in operative position, a shutter mechanism including at least a rotary element mounted on the rear of said intermediate wall for obturating said exposure aperture, means coupled with said shutter mechanism and said rear casing section and responsive to pivotal movement of said forward and rear casing sections relative to one another for setting said shutter mechanism, and means defining a passage at the lower ends of said forward and rear casing sections communicating with said guide means and said storage chamber through which at least a photosensitive and a second sheet may be introduced into and withdrawn from said apparatus.

18. Photographic apparatus for use with a film unit comprising a photosensitive sheet and a second sheet secured in superposition therewith, said apparatus comprising, in combination, a rear casing section having a rear wall and providing a first chamber, guide means within said first chamber for positioning a photosensitive sheet for exposure against said rear wall, a forward casing section pivotally mounted at its lower end on said rear casing section adjacent the lower end of the latter, said forward casing section including spaced-apart forward and intermediate walls providing a second chamber therebetween for positioning a second sheet apart from a photosensitive sheet engaged in said guide means, said forward casing section having a first position wherein it is located within said first chamber with said intermediate wall adjacent and generally parallel with said rear wall and a second position wherein said intermediate wall is disposed at an acute angle with respect to said rear wall, said forward casing section being pivotable with respect to said rear casing section between said first and second positions, means defining a passage located adjacent the lower ends of said forward and rear casing sections and communicating with said first and second chambers, means located within said passage and so positioned as to extend between the photosensitive and second sheets of a film unit during movement of said film unit through said passage into said apparatus for separating said photosensitive and second sheets and, when said forward casing section is in said first position, guiding said photosensitive sheet into engagement with said guide means against said rear wall and said second sheet into said second chamber forward of said intermediate wall, a folding bellows secured between said forward and rear casing sections for providing an exposure chamber between said sections when said forward section is in said second position, an upstanding wall located on the upper portion of said forward casing section and extending upward therefrom at an obtuse angle with respect to said intermediate wall, a photographic objective lens mounted in said upstanding wall with its optical axis substantially perpendicular to said rear wall when said forward casing section is in said second position, a shutter mechanism mounted on the rear of said intermediate wall, said shutter mechanism comprising at least one generally flat rotary element pivotally mounted on said wall for rotation about an axis substantially perpendicular to said intermediate wall and having an upstanding portion extending behind said lens for obturating said lens, means coupled with said shutter mechanism and said rear casing section and responsive to pivotal movement of said forward and rear casing sections relative to one another, for setting said shutter mechanism, and means, coupled with said means for providing said passage, for superposing said photosensitive and second sheets comprising said film unit and distributing a fluid processing reagent between said sheets during movement thereof through said passage.

References Cited in the file of this patent

UNITED STATES PATENTS

| | | |
|---|---|---|
| 1,184,110 | Linder | May 23, 1916 |
| 2,435,720 | Land | Feb. 10, 1948 |

FOREIGN PATENTS

| | | |
|---|---|---|
| 24,350 | Great Britain | Nov. 29, 1901 |